United States Patent
Cassar et al.

(10) Patent No.: US 7,960,042 B2
(45) Date of Patent: Jun. 14, 2011

(54) CEMENT-BASED PAVING BLOCKS FOR PHOTOCATALYTIC PAVING FOR THE ABATEMENT OF URBAN POLLUTANTS

(75) Inventors: Luigi Cassar, San Donato Milanese (IT); Roberto Cucitore, Redona (IT); Carmine Pepe, Ponteranica (IT)

(73) Assignee: Italcementi S.p.A., Bergamo (IT)

( * ) Notice: Subject to any disclaimer, the term of this patent is extended or adjusted under 35 U.S.C. 154(b) by 401 days.

(21) Appl. No.: 10/544,854

(22) PCT Filed: Feb. 18, 2004

(86) PCT No.: PCT/EP2004/001525
§ 371 (c)(1),
(2), (4) Date: Aug. 5, 2005

(87) PCT Pub. No.: WO2004/074202
PCT Pub. Date: Sep. 2, 2004

(65) Prior Publication Data
US 2006/0147756 A1 Jul. 6, 2006

(30) Foreign Application Priority Data
Feb. 18, 2003 (IT) .............................. MI2003A0291

(51) Int. Cl.
*B32B 13/04* (2006.01)
*C04B 7/00* (2006.01)
*C04B 28/02* (2006.01)
*E01C 5/04* (2006.01)
*B05D 7/00* (2006.01)

(52) U.S. Cl. ........ 428/702; 428/221; 428/323; 428/701; 106/713; 106/733; 106/819; 404/18; 404/34; 404/73; 404/99; 427/126.3; 427/136; 427/403; 427/419.2

(58) Field of Classification Search ................. 106/733, 106/738, 754, 713, 819; 404/17, 29, 34, 404/99, 18, 73; 428/221, 323, 701, 702; 427/126.3, 136, 403, 419.2
See application file for complete search history.

(56) References Cited

U.S. PATENT DOCUMENTS
6,409,821 B1 * 6/2002 Cassar et al. ................. 106/733

FOREIGN PATENT DOCUMENTS
EP 885857 * 12/1998
EP 0885857 A1 12/1998
(Continued)

OTHER PUBLICATIONS
Kaneda JP-2002-239398 English Machine Translation.*
(Continued)

*Primary Examiner* — Timothy M Speer
*Assistant Examiner* — Lauren Robinson
(74) *Attorney, Agent, or Firm* — Abelman, Frayne & Schwab

(57) ABSTRACT

Paving blocks for photocatalytic paving comprising at least a base layer in cementitious material and a surface layer based on a cementitious composition comprising:
at least a hydraulic binder, a photocatalyst capable of oxidizing organic and inorganic polluting substances present in the environment in the presence of environmental light, air and humidity, at least an aggregate, water and, optionally, a water reducing additive.

59 Claims, 1 Drawing Sheet

FOREIGN PATENT DOCUMENTS

| | | | |
|---|---|---|---|
| EP | 1020564 A1 | | 7/2000 |
| JP | 2000045204 | | 2/2000 |
| JP | 2002-239398 | * | 8/2002 |
| JP | 2002242113 | | 8/2002 |
| WO | WO 9805601 | | 7/1997 |
| WO | WO 9805601 | * | 2/1998 |

OTHER PUBLICATIONS

Calza & Pelizzetti, Photocatalytic transformation of organic compounds in the presence of inorganic ions, Pure Appl. Chem., vol. 73, No. 12, pp. 1839-1848, 2001.

International Search Report, PCT/EP2004/001525, Jun. 7, 2004.

* cited by examiner

CEMENT-BASED PAVING BLOCKS FOR PHOTOCATALYTIC PAVING FOR THE ABATEMENT OF URBAN POLLUTANTS

FIELD OF THE INVENTION

The present invention relates to a cement-based paving block for photocatalytic paving for the abatement of urban pollutants, more specifically to a paving block comprising a surface layer based on a cementitious composition with photocatalytic properties capable of abating organic and inorganic pollutants, such as condensation polymer aromatics, aldehydes, benzene, carbon black equivalent to PM10, oxides of nitrogen ($NO_x$) and of sulfur ($SO_x$), carbon monoxide (CO) and a base layer of cementitious nature.

PRIOR ART

Atmospheric pollution is caused by the presence of one or more undesirable or foreign substances in the air, in quantities and for a duration that modify the healthiness of the air and create a hazard for human health.

By considering the amount of air inhaled each day by one person (from 6 to 9 liters of air per minute at rest, that is around 9-13 cubic meters of air per day), it is easy to understand its importance for health and the risks related to inhaling polluted air.

In general, the main sources of pollution are formed of atmospheric emissions deriving from production processes (industries and small businesses) and combustion processes (heating and vehicle traffic).

The main source of pollution comes from vehicle traffic. This is responsible for atmospheric emissions of the combustion products of engines, for powders released through wear on brakes, tires and the road surface and finally for the hydrocarbons that vaporize from vehicle fuel tanks.

Exhaust fumes from motor vehicles, deriving from incomplete fuel combustion, include numerous substances in the form of gases and powders.

Among these, the main substances are: carbon monoxide (CO); oxides of nitrogen (NOx); oxides of sulfur (SOx); volatile organic compounds (VOC); total suspended particulates (TSP) containing a large number of pollutants: lead, cadmium, aromatic polycyclic hydrocarbons, to name but the most significant.

The vast contribution of vehicle traffic towards atmospheric emissions is also confirmed by the fact that pollution in urban areas is no longer limited to the winter but has become, with more or less acute episodes, a constant throughout the entire year. The aforesaid atmospheric pollutants have an irritating action on the mucous membranes, in particularly those of the respiratory tract. To solve these problems different solutions have been proposed; one of the most interesting relates to the use of cementitious materials containing photocatalysts that, applied to the outside walls of buildings, are capable of oxidizing the polluting substances present in the environment that come into contact with the surfaces of these components.

The Applicant has filed in its name two patent applications for cementitious materials containing photocatalysts. The first application WO 98/05601, relates to cementitious materials comprising mainly $TiO_2$ particles in anatase form capable of photo-oxidizing the polluting substances present in the environment in order to prolong preservation of the original color of the material once laid. The second application WO 01/00541, instead relates to the use of specific additives to obtain a cementitious based paint with photocatalytic properties.

Interlocking paving blocks are made of vibration-compressed concrete characterized by different geometries that are generally laid using "mosaic" laying solutions. Paving made of paving blocks can be used in residential and urban settings, where they are subject to light loads, and to produce surfaces subjected to medium-heavy loads such as pavements, pedestrian areas, areas surrounding buildings, cycle lanes, car parks, and roads with slow vehicle traffic.

The patent EP 786283 describes interlocking paving blocks for the abatement of $NO_x$ containing titanium dioxide in the surface layer.

According to this document it is however necessary to use quantities of $TiO_2$ varying from 5 to 50 percent in weight with respect to the cement in order to obtain an adequate degrading activity of the oxides of nitrogen. However, these quantities of $TiO_2$ have the disadvantage of increasing the slipperiness of the paving block, which may be reduced by adding a suitable amount of sand to the mix. Therefore, the need was felt to obtain a interlocking paving block in which the quantity of $TiO_2$ was minimized, not only for reasons related to cost, but also to decrease the slipperiness of the paving block, without reducing its photocatalytic activity. The interlocking paving block has some particularities that make it essentially different to normal road paving; in fact it is characterized by a high level of permeability that allows optimum drainage of water, is maintenance free and is easily removed and replaced.

SUMMARY OF THE INVENTION

The applicant has now surprisingly found that it is possible to obtain paving blocks for photocatalytic paving with a surface layer produced by a cementitious composition comprising a $TiO_2$-based photocatalyst that allows the photocatalytic activity to be increased for contents of $TiO_2$ equivalent to those used in prior art ranging from 0.1% to 50% in mass with respect to the cement and that also allow efficacious use of $TiO_2$ for lower dosages to those indicated in prior art, namely ranging from 0.1% to 4.9% in mass with respect to the cement or binder. The aforesaid paving blocks have photocatalytic activity in oxidizing urban pollutants equal to or even higher than the one described in prior art, for higher photocatalyst contents. Said application also allows considerable economic advantages to be obtained, as the quantity of photocatalyst can be reduced. The use of such low dosages for the surface layer allows slipperiness of the paving to be reduced without modification to the draining capacities.

The Applicant has thus found a way to produce an improved type of paving block for photocatalytic paving, for the abatement of urban pollution, comprising at least a base layer, for example constituted by a cementitious material, and a surface layer, which remains in direct contact with the environment, based on a cementitious mixture, containing a $TiO_2$-based photocatalyst with photocatalytic properties, said photocatalyst having a surface area ranging from 15 to 350 $m^2/g$ and being added in a proportion ranging from 0.1% to 50% in mass with respect to the cement, preferably from 0.1% to 4.9% in mass with respect to the cement, said paving blocks for photocatalytic paving being capable of abating organic and inorganic pollutants present in the environment, such as condensation polymer aromatics, aldehydes, benzene, carbon black equivalent to PM10, oxides of nitrogen ($NO_x$) and of sulfur ($SO_x$).

DETAILED DESCRIPTION OF THE INVENTION

Figure 1:
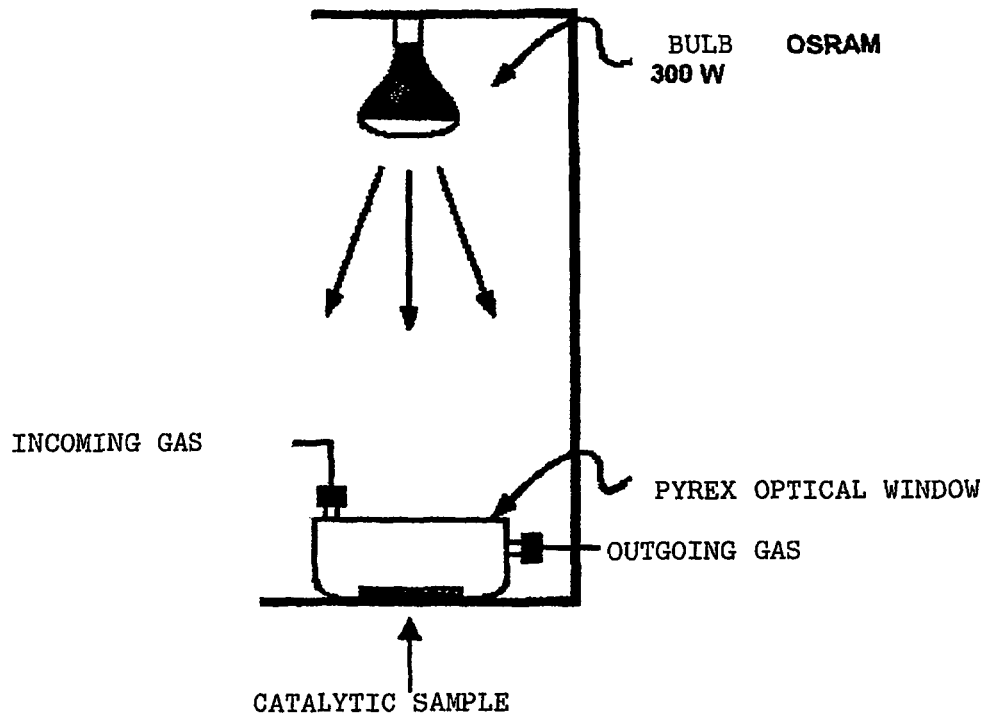
FIG. 1: graphic representation of experimental details of the reaction chamber (1.5 L or 3.5 L) containing the photocatalyst sample, or catalyst sample, said chamber having a Pyrex optical window, as described in Example 3.

Therefore, an object of the present invention is a paving block for photocatalytic paving capable of abating the pollutants present in the environment, comprising at least a base layer, generally in cementitious material, and a surface layer based on a cementitious composition comprising:
I. a hydraulic binder
II. a $TiO_2$-based photocatalyst capable of oxidizing polluting organic and inorganic substances present in the environment in the presence of environmental light, air and humidity
III. water
IV. at least an aggregate
V. optionally a water reducing additive
said $TiO_2$-based photocatalyst having a specific surface ranging from 15 to 350 $m^2/g$.

In a preferred embodiment of the present invention, the surface layer of the paving block for photocatalytic paving has a void volume of 10-40% and/or a water permeability of at least 0.01 cm/sec.

The $TiO_2$-based photocatalyst present in the surface layer of the paving block, forming the object of the present invention, is contained in the cementitious composition, or in its precursor the corresponding dry premix, constituting the base of the surface layer, in a quantity ranging from 0.1% to 50% in mass with respect to the cement or binder, preferably from 0.1% to 4.9% in mass with respect to the cement or binder.

More specifically, the quantity of $TiO_2$ based photocatalyst having a specific surface ranging from 15 to 350 $m^2/g$, present in the surface layer of the paving block, forming the object of the present invention, ranges from 0.12% to 2.6% in mass with respect to the cement or binder, preferably from 0.25% to 2.5% in mass with respect to the cement or binder, more preferably from 0.5% to 2.45% in mass with respect to the cement or binder, the most preferable being 1% in mass with respect to the cement or binder; alternatively said quantity of photocatalyst ranges from 2.6% to 4.9% in mass with respect to the cement or binder, preferably from 3% to 4.5% in mass with respect to the cement or binder, more preferably from 3.5% to 4% in mass with respect to the cement or binder.

In a further embodiment of the present invention, the Applicant found a synergic effect, in the photocatalytic activity of oxidizing $NO_R$, by $TiO_2$-based photocatalysts with specific surface from 15 to 350 $m^2/g$ when in combination with $TiO_2$ based photocatalysts with specific surface below 15 $m^2/g$.

Therefore, a further object of the present invention is a paving block for photocatalytic paving as described hereinbefore wherein the $TiO_2$ with specific surface from 15 to 350 $m^2/g$ is combined with $TiO_2$ with specific surface below 15 $m^2/g$ to provide a mixture comprising: from 99.9% to 0.1% in mass of said mixture, of $TiO_2$ with specific surface from 15 to 350 $m^2/g$ and from 0.1% to 99.9% in mass of said mixture, of $TiO_2$ with specific surface below 15 $m^2/g$, preferably a mixture comprising: from 75% to 25% in mass of said mixture, of $TiO_2$ with specific surface from 15 to 350 $m^2/g$ and from 25% to 75% in mass of said mixture, of $TiO_2$ with specific surface below 15 $m^2/g$, more preferably a mixture comprising: from 70% to 55% in mass of said mixture, of $TiO_2$ with specific surface from 15 to 350 $m^2/g$ and from 30% to 45% in mass of said mixture, of $TiO_2$ with specific surface below 15 $m^2/g$.

The preferred photocatalyst according to the present invention is titanium dioxide ($TiO_2$) or one of its precursors, and more typically "titanium oxide at least partially in anatase form".

The expression "titanium oxide at least partially in anatase form" means that the photocatalyst particles present in the hydraulic binder of the present invention are particles of titanium dioxide ($TiO_2$) having anatase structure for at least 5%, preferably for 25%, more preferably for at least 50% and even more preferably for at least for 70%, as percentage in mass with respect to the total titanium oxide ($TiO_2$).

In a particularly preferred aspect of the invention, the photocatalyst particles are particles of anatase titanium oxide at 100%. Said particles of titanium oxide having photocatalytic activity and present in the cementitious composition, and of its precursor the corresponding dry premix, forming the base of the surface layer of the paving block forming the object of the present invention, in any case have a specific surface ranging from 15 to 350 $m^2/gr$, more specifically from 60 to 290 $m^2/gr$, preferably from 105 to 250 $m^2/g$.

In a further preferred aspect of the invention TiO2 PC 105 and PC 500, commercialized by "Millennium Inorganic Chemical", was used.

The expression "titanium dioxide precursor" means that the preferred photocatalyst is not only limited to "TiO2 at least partially in anatase form" but it is also extended to any product which added to the clinker, to the hydraulic binder, to the premix or to the mix, can form the TiO2 mainly in anatase form, optionally with suitable heat treatments.

For example, "titanium paste" may be considered a valid precursor for the titanium dioxide-based photocatalyst of the present invention.

Photocatalytic activity may also be obtained on TiO2 matrices doped with suitable atoms such as Fe(III), Mg(II), Mo(V), Ru(III). Os(III), Re(V), V(IV) and Rh(III).

In particular, these atoms may substitute, at atomic level, the Ti(IV) present in the TiO2 matrix for at least 0.5% in mass of the total titanium dioxide ($TiO_2$).

The method for obtaining these photocatalysts is described in the literature for example in J. Phys. Chem. 1994, 98, 1127-34, Angew. Chemie 1994, 1148-9 and in Angew. Chemie Int., Ed. 1994, 33, 1091 and in the Applicant's patent WO 01/00541.

The thickness of the photocatalytic surface layer of the paving block for paving forming the object of the present invention, irrespective of the type of screed, may vary from values of around 0.1 mm to values of around 20 mm, without modifying its photocatalytic activity, preferably from 5 to 12 mm and even more preferably from 7 to 10 mm.

The surface of the surface layer of the aforesaid paving block may be roughened in order to increase the specific surface in contact with the air and, at the same time, increase friction. This result may be obtained by suitably shaping the formworks or by acting mechanically on the surface after stripping. In the latter case manual or automatic action can be taken, using suitable tools, to produce grooves or small craters distributed over the surface of the upper layer of the paving block.

The term "paving block for photocatalytic paving" is intended as a paving block destined for road and also pedestrian paving, for example for pavements or pedestrian areas in general, having at least two layers; at least a layer based on cementitious material, and a surface layer based on a cementitious composition comprising photocatalysts capable of abating organic pollutants present in the environment.

The term "organic pollutants present in the environment" is intended, purely as an example, as organic pollutants such as condensation polymer aromatics, aldehydes, benzene, carbon black equivalent to PM10, and inorganic pollutants such as oxides of nitrogen ($NO_x$) and of sulfur ($SO_x$), and carbon monoxide (CO).

The paving blocks for photocatalytic paving according to the present invention are laid or produced according to common rules of good practice.

The pollutants abated through the photocatalytic action of the surface layer of the paving block forming the object of the present invention are then removed from said photocatalytic surface through the cleansing action of rainfall or by periodically washing urban roads.

The production or laying of the paving block forming the object of the present invention represents the essential element of the method for the abatement of organic and inorganic pollutants present in the environment.

A further object of the present invention is therefore formed of a method for the abatement of organic and inorganic pollutants present in the environment comprising the laying of paving blocks for photocatalytic paving as described hereinbefore.

Yet another object of the present invention is formed of the cementitious compositions, and of their precursors the corresponding dry premixes, suitable to prepare the surface layer of paving blocks for photocatalytic paving according to the invention.

In particular, as a further preferred embodiment of the present invention the cementitious composition, or its precursor the dry premix, essential components of the surface layer of the paving block do not include at least one of the following organic additives:

a) at least a melamine resin, obtained from melamine condensed with formaldehyde; b) at least a cellulose ether; c') at least a polymer chosen from ethylene polymer, acrylic polymer and terpolymer comprising as co-monomers at least an ester of acrylic acid with an alcohol and at least an ester of vinyl alcohol with a carboxylic acid, or alternatively to the component c'), c'') a latex chosen from acrylic latex, styrene latex, butadiene latex; d) at least a chemically modified starch.

In paving blocks for paving according to the present invention the cementitious composition, or its precursor the corresponding dry premix, the base component of the surface layer of the paving block for paving may also include fillers of mineral origin or inorganic filling materials, synonymous with each other according to the present invention. Example of fillers of mineral origin are pozzolanas, metakaolin, slag, fly ash and silica fumes.

In the present text "binder" or "hydraulic binder" is intended as a powdered material in solid state, dry, which when mixed with water provides plastic mixtures capable of setting and hardening, even under water, for example a cement.

"Dry premix" is intended as a homogeneous mixture suitable to be mixed with water and provide cementitious compositions (such as mortars and concretes) comprising at least one cementitious binder, one or more additives for cementitious compositions and, optionally, one or more aggregates.

"Cementitious composition" or "cementitious mix" is intended as a composition wherein a binder is mixed with water, optionally with aggregates of different granulometry. Cementitious compositions therefore include both cementitious "pastes", i.e. mixtures of binder and water, without aggregates, and mixes, that is mixtures comprising water, binder and aggregates.

The "aggregates", "inert materials" or "inert aggregates", synonymous with one another according to the present invention, may be fine aggregates, such as sand and fillers, and are defined in the standard UNI EN 206.

Examples of mixes are mortars (mixtures with binder, water and fine aggregate), and concretes (mixtures with water, binder, fine aggregate and coarse aggregate).

The "clinker" used to prepare a binder for the present invention is any clinker of Portland cement as defined according to the standard UNI EN 197.1, that is a hydraulic material at least two thirds in mass of which are composed of calcium silicates ($3CaO\ SiO_2$) and ($2CaO\ SiO_2$), the remaining part being composed of $Al_2O_3$, $Fe_2O_3$ and other oxides.

The broad definition of "hydraulic binder", according to the present invention, includes both cements (white, grey or pigmented) defined according to the aforesaid standard UNI EN 197.1 and the so-called cements for storage dams, cementitious agglomerates and hydraulic limes as defined in Italian Law 26 May 1965 No. 595 and inorganic silicates.

The broad definition "water reducing additive" according to the present invention includes both water reducing additives with normal efficacy and with high efficacy, which can respectively be called "fluidifying" and "super fluidifying" agents as defined in the standard UNI EN 934-2.

According to the present invention, the dry premix or the cementitious compositions obtained from it may therefore contain white, grey or pigmented cement.

In the present text the term in mass indicates that the photocatalyst is added to the mass of the binder, in the dry premix or in the cementitious compositions according to the present invention and is therefore distributed throughout the entire mass, that is also in the inner and deeper layers and not merely on the surface.

Particularly preferred cementitious compositions of the present invention to produce the surface layer of the paving block are mortars and concretes suitable to produce, by means of vibration-compacting, precast components containing the aforesaid photocatalyst.

Dry state is intended as the degree of humidity that does not significantly modify the composition of the mixture.

Dry premixes, precursors of the cementitious compositions forming the surface layer of the paving block according to the present invention, therefore include at least a hydraulic binder (for example a cement), the aforesaid catalyst and at least an aggregate.

According to typical embodiments of the present invention, the dry premix, precursor of the cementitious compositions, contains the following inorganic components: at least a hydraulic binder (typically a cement); at least an aggregate or inert material; optionally a filler of mineral origin or an inorganic material, synonymous with each other according to the present invention, the aforesaid photocatalyst and the necessary water. The types and preferred quantities of hydraulic binder, aggregate and, optionally, filler of mineral origin are the same as those specified hereunder for the cementitious compositions.

Preferred cementitious compositions, and their precursors the corresponding dry premixes, of the present invention, particularly suitable to prepare paving blocks for photocatalytic paving according to the present invention, in addition to the aforesaid photocatalyst, a hydraulic binder (typically a cement), include the following inorganic materials: at least an aggregate and optionally a filler of mineral origin or inorganic filling material.

The cementitious compositions, and their precursors the corresponding dry premixes, to produce the surface layer of the paving blocks for photocatalytic paving according to the present invention, contain for example the following percentages in mass of inorganic components, with reference to the total mass of the inorganic components in dry state:

hydraulic binder (typically cement): from 12% to 50% in mass, more preferably around 25% in mass;

aggregate (typically sand): from 50% to 88% in mass, more preferably around 75% in mass;

filler of mineral origin: up to 10% in mass, more preferably around 5% in mass.

The hydraulic binder is typically a cement, preferably a grey cement.

For example, it is possible to use a grey cement type I according to the standard UNI EN 197.1 (such as the grey cement type I-52.5 R), more particularly in a quantity ranging from 12% to 45%, more preferably around 25% in mass of the total inorganic components in dry state, or type II (such as cement type II/B-L, according to the standard UNI EN 197.1), in particular in a quantity ranging from 15% to 50% in mass of the total inorganic components in dry state.

The aggregate is typically sand, silica or calcareous, having for example particles with dimensions ranging from 0.075 mm to 4 mm.

The filler of mineral origin increases the strength and decreases the porosity of cementitious compositions containing it.

The filler of mineral origin is for example chosen from metakaolin ($Al_2O_3 \cdot SiO_2$) and silica fumes and their mixtures, preferably a mixture of these.

The water reducing additive allows the water content in the cementitious compositions to be reduced without influencing their consistency or their rheological properties to be varied without influencing the water content or both these effects to be produced simultaneously. The water reducing additive is, for example, chosen from products based on lignosulphonates or naphthalene, melamine or acrylic based. The quantity of water reducing additive optionally employed in cementitious compositions is the quantity required to provide optimum consistency when the mixture is fresh.

In typical compositions according to the present invention described hereinbefore, the titanium dioxide is preferably 100% in anatase form.

The cementitious compositions and their typical precursors the corresponding dry premixes according to the present invention have the compositions indicated hereunder in Examples 1 and 2.

Cementitious compositions, and their corresponding precursors the corresponding dry premixes, are in particular mortars having binder/aggregate mass ratios ranging from 1/4 to 1/1 or concrete having binder/aggregate mass ratios ranging from 1/3 to 1/7.

The quantity of water employed in the cementitious compositions is the quantity required for the hydration reaction of the binder and to provide optimum consistency when the mixture is fresh. The proportion of water, binder and, optionally, aggregates of the cementitious compositions may vary within wide limits, and is a function of the properties and of the final uses required of the mortars and concretes. In general terms, the quantity of water ranges from around 20% to 60% in mass with respect to the mass of the binder.

The mixing method may be any conventional method. The temperature at which the binder, and any aggregates, are mixed with water is generally between +5° C. and 30° C. and preferably at least 20° C.

The way in which the photocatalyst is added is not an essential characteristic of the invention; the photocatalyst may simply be added to the powder of the hydraulic binder or to the components of the mixture of additives, of the premix or of the cementitious compositions and mixed with any of the prior art methods, either using an automatic mixer or manually.

The photocatalyst may also be suitably mixed with the mixture in the form of aqueous suspension. The fact that the photocatalyst can be added in such a simple manner makes the use of premixes particularly preferred to implement the present invention. A few examples, to be considered non-limiting, relative to the described invention, are provided hereunder.

Example 1

Cement-based formulation with high photocatalytic activity for the production of the surface layer of photocatalytic paving blocks.

| Dry mix | n. | 1 | Optimal 1 |
|---|---|---|---|
| Grey cement Type II/B-LL 42.5 R | % | 13 ÷ 17 | 15.4 |
| Silica sand (0.25-4 mm) | % | 82.5 ÷ 85.5 | 84 |
| Titanium Dioxide | % | 0.3 ÷ 0.9 | 0.6 |

The quantity of water ranges from 6 to 6.5% in mass of the inorganic materials in dry state.

Example 2

Cement-based formulation with high photocatalytic activity for the production of the surface layer of photocatalytic paving blocks.

| Dry mix | n. | 2 | Optimal 2 |
|---|---|---|---|
| Grey cement Type II/A-LL 42.5 R | % | 19 ÷ 23 | 20.6 |
| Silica sand (0.25-4 mm) | % | 77 ÷ 80 | 78.6 |
| Titanium Dioxide | % | 0.6 ÷ 1.0 | 0.8 |

The quantity of water ranges from 7 to 7.5% in mass of the inorganic materials in dry state.

Example 3

Some samples of paving block are prepared comprising a surface layer having the composition described in Examples 1 and 2, the $NO_x$ abating properties of which are verified.

Instruments $NO_x$ are analyzed using a Monitor Labs Model 8440E instrument, which functions according to the principle of chemiluminescence detection. The instrument has four sensitivity ranges:

from 0.2 to 5 ppm (parts per million); from 0.1 to 10 ppm; from 0.05 to 5 ppm; from 0.2 to 10 ppm.

As a function of the sensitivity ranges chosen, the precision of the instrument is 4 ppb (parts per billion) out of 100 ppb or 2.5 ppb out of 400 ppb.

Experimental Set Up

Figure 2:
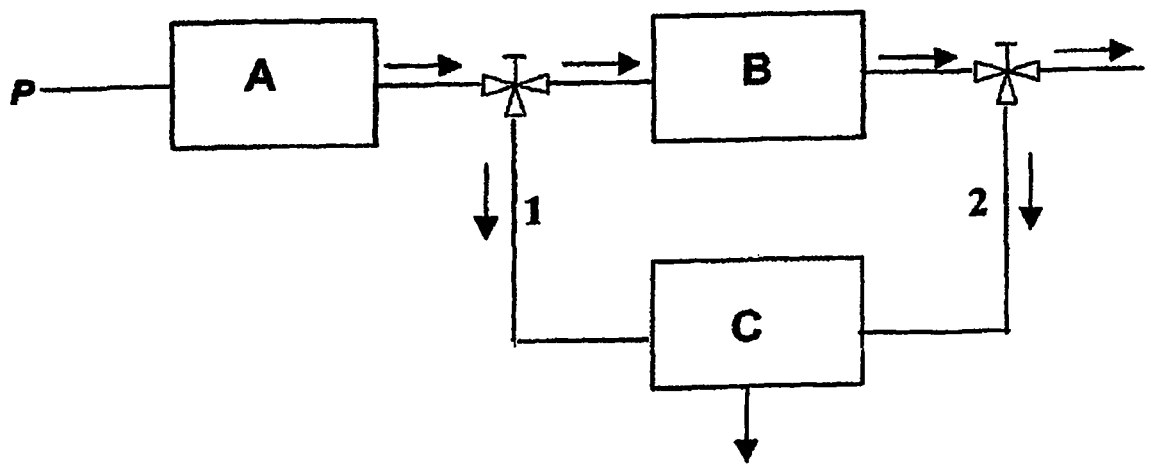
FIG. 2: graphic representation of the diagram I, as described in Example 3, wherein A is a mixing chamber, B is the reaction chamber, C is the $NO_x$ chemiluminescence detector, P is the inlet of chamber A, 1 and 2 are the paths taken by the flow of gas.

Diagram I hereunder, as shown in FIG. 2, describes the method of measuring the degree of $NO_x$ and $NO_2$ abatement through photocatalytic action.

Diagram I

A—is a mixing chamber wherein a mixture of NO/NO$_2$ or of NO$_2$ salts is diluted in air to provide the established quantity of pollutants. The adopted experimental procedure uses small bottles (2-5 L) of pure NO and NO$_2$ that are used to fill a vacuum line of the pure gas. By means of suitable sampling vials, the quantities of gas required are collected from this line to be diluted in air through the inlet P of the chamber.

B—is the reaction chamber (1.5 L o 3.5 L) containing the photocatalyst sample, the experimental details of which are shown in FIG. 1:

C—in diagram I it is the NO$_x$ chemiluminescence detector described hereinbefore. The set-up shown in diagram I can operate both in conditions of continuous flow and with gas recirculation. The first case is shown in diagram I: if the flow of gas follows the path 1, the quantity of NO can be measured at the reactor inlet; instead, with the path 2, the quantity of NO can be measured at the outlet after the gas has come into contact with the catalyst, both in the dark and under irradiation.

NO$_x$ Abatement Test

Test pieces with surfaces measuring 10 cm×10 cm were inspected using an optical microscope in order to exclude the presence of cracks that could endanger the quality of the photocatalytic efficiency analysis. The degree of NO abatement, using the layout of the path 1 described in the experimental set up, was evaluated as:

$$\text{Degree of } NO_x \text{ abatement (\%)} = \frac{(NO_x \text{ concentration at the inlet} - NO_x \text{ concentration at the outlet})}{NO_x \text{ concentration at the inlet}} \times 100$$

The values are indicated in Table 1.

TABLE 1

Percentage of NO$_x$ oxidized through test pieces of paving block having different types of TiO$_2$ in the surface layer

| TiO$_2$ identification | % of TiO$_2$ compared with the cement | TiO$_2$ surface area (m$^2$/g) | After 20 min of recirculation in the dark | After 20 min of recirculation in the light |
|---|---|---|---|---|
| AT1 * | 3 | <15 | 79.5 | 84.3 |
| AT1 * | 10 | <15 | 80.1 | 90.0 |
| PC 105 | 3 | 60 | 78.6 | 91.5 |
| PC 500 | 3 | 290 | 83.0 | 94.5 |
| PC 50 | 3 | 35 | 81.0 | 90.8 |

* for comparison

In practice, it is observed that activity is higher if TiO$_2$ with a surface area ranging from 15 to 290 m$^2$/g is used; in other words, TiO$_2$ with a surface area below 15 m$^2$/g dosed at 10% in weight with respect to the binder acts like TiO$_2$ dosed at 3% with a larger surface area.

The use of TiO$_2$ according to the indications in the present invention allows reduction of its weight percentage with respect to the binder, without penalizing the photocatalytic activity of the surface layer of the paving block. This makes it possible to reduce the unit cost of the cementitious mixture employed for the surface layer of the paving block forming the object of the present invention and, at the same time, reduce the slipperiness of said layer.

Example 4

In order to verify the efficacy of the photocatalytic system of the paving blocks of the invention, the content of the wash water of the paving blocks was analyzed. The photocatalytic action causes oxidizing of NO to NO$_2$ and consequent forming of nitrate ion that remains adsorbed in the cementitious matrix.

Table 2 shows the distribution of the NO$_2^-$/NO$_3^-$ ratio detected in the leaching waters after having washed the test pieces with denatured water. Washing is considered complete after around 90% of the NO$_2$ adsorbed has been recovered.

TABLE 2

Distribution of the NO$_2^-$/NO$_3^-$ ratio detected in the leaching waters after having washed the test pieces with denatured water °)

| TiO$_2$ identification | % of TiO$_2$ compared with cement | TiO$_2$ surface area (m$^2$/g) | % NO$_2^-$/NO$_3^-$ in the dark | % NO$_2^-$/NO$_3^-$ in the light |
|---|---|---|---|---|
| AT1 * | 3 | <15 | 63.0/37.0 | 57.5/42.5 |
| AT1 * | 10 | <15 | 63.5/36.5 | 18.8/81.2 |
| PC 105 | 3 | 60 | 62.4/37.6 | 17.8/82.2 |
| PC 500 | 3 | 290 | 68.3/31.7 | 13.0/87.0 |
| PC 50 | 3 | 35 | 64.3/35.7 | 15.5/84.5 |

* for comparison

As can be observed in Table 2, the ratio between nitrite and nitrate ions moves to increasing quantities of nitrate after exposure to light.

Also in this case the activity of the photocatalyst with surface area>15 m$^2$/g is decidedly higher than the activity of the photocatalyst with surface area<15 m$^2$/g.

Example 5

Essentially following the preparations described in examples 1 and 2, another three compositions were prepared characterized by equivalent dry components, as indicated hereunder:

| Dry mix | n. | |
|---|---|---|
| | | 3 |
| White cement Type I 42.5 R | % | 19 |
| Silica sand (0.25-4 mm) | % | 80.2 |
| Titanium Dioxide AT 1 | % | 0.80 |
| | | 4 |
| White cement Type I 42.5 R | % | 19 |
| Silica sand (0.25-4 mm) | % | 80.2 |
| Titanium Dioxide PC 105 | % | 0.80 |
| | | 5 |
| White cement Type I 42.5 R | % | 19 |
| Silica sand (0.25-4 mm) | % | 80.2 |
| Titanium Dioxide PC 105 + AT1 | % | 0.80 |

Essentially following the procedure described in Example 3 and the relative NO$_x$ abatement test, the three compositions described hereinbefore were tested.

TABLE 3

| Composition | % NO$_2$ abated |
|---|---|
| 3 | X |
| 4 | XX |
| 5 | XXX |

Evaluation of the % of NO$_2$ abated is expressed qualitatively, indicated as X=minimum, XX=high, XXX=optimum.

As can be seen in table 3 there is a synergic effect due to the use of TiO$_2$ mixtures with different surface areas.

Example 6

Tests were performed on samples of paving block containing in the cementitious surface layer 3% of $TiO_2$ with a surface area of 60 ($m^2/g$) (samples B and C). The experiments were conducted in conditions of gas recirculation ($NO_2$+air). Sample A has no $TiO_2$. The results are summarized in Table 4.

TABLE 4

| Sample | Initial ppm | ppm (60 min) | Residual ppm (%) |
|---|---|---|---|
| A* (dark) | 0.5 | 0.18 | 36 |
| A (light) | 0.48 | 0.20 | 40 |
| B (light) | 0.45 | 0.05 | 11 |
| C (light) | 0.48 | 0.06 | 12.5 |

The two samples B and C behave analogously under light.

The invention claimed is:

1. Paving block for photocatalytic paving capable of abating pollutants present in the environment, comprising at least a base layer in cementitious material and a surface layer made from a cementitious composition which comprises:
   I. a hydraulic binder
   II. a $TiO_2$-based photocatalyst capable of oxidizing polluting organic and inorganic substances in the environment in the presence of environmental light, air and humidity
   III. water
   IV. at least an aggregate
   V. optionally, a water reducing additive, the $TiO_2$-based photocatalyst being from 0.1% to 4.9% by weight of the said hydraulic binder and having a specific surface area selected in the range from 60 to 290 $m^2/g$.

2. Paving block as claimed in claim 1, wherein the surface layer of the paving block for photocatalytic paving has a void volume of 10-40% and/or water permeability of at least 0.01 cm/sec.

3. Paving block as claimed in claim 1, wherein the $TiO_2$ photocatalyst is at least partially in anatase form.

4. Paving block as claimed in claim 3, wherein the particles of $TiO_2$ have anatase structure for at least 5%.

5. Paving block as claimed in claim 4, wherein the particles of $TiO_2$ have anatase structure at 100% in mass of the total $TiO_2$.

6. Paving block as claimed in claim 4, wherein the particles of $TiO_2$ have anatase structure for at least 50% as percentage in mass of the total $TiO_2$.

7. Paving block as claimed in claim 1, wherein the $TiO_2$ has a specific surface area from 105 to 250 $m^2/g$.

8. Paving block as claimed in claim 1, wherein the thickness of the photocatalytic surface layer varies from values of 0.1 mm to values of 20 mm.

9. Paving block as claimed in claim 1, wherein the cementitious composition also includes fillers of mineral origin or inorganic filling.

10. Paving block as claimed in claim 1, wherein the hydraulic binder is chosen from a cement or a clinker.

11. Paving block as claimed in claim 10, wherein the cement is chosen from the group consisting of: white, grey or pigmented cement or their mixtures.

12. Paving block as claimed in claim 11, wherein the cement is grey cement.

13. Paving block as claimed in claim 1, wherein the cementitious composition forming the base of the surface layer is in the form of mortar or concrete.

14. Paving block as claimed in claim 13, wherein the cementitious composition is a mortar having binder:aggregate mass ratios ranging from 1:4 to 1:1 or concrete having binder:aggregate mass ratios ranging from 1:3 to 1:7.

15. Paving block as claimed in claim 1, wherein the cementitious composition of the surface layer contains the following percentages in mass of inorganic components, with reference to the total mass of the inorganic components in dry state:
   hydraulic binder: from 12% to 50% in mass;
   aggregate: from 50% to 88% in mass;
   filler of mineral origin: up to 10% in mass.

16. Paving block as claimed in claim 15, wherein the hydraulic binder is grey cement.

17. Paving block as claimed in claim 1, wherein the aggregate is sand, silica or calcareous, having particles with dimensions ranging from 0.075 mm to 4 mm.

18. Paving block as claimed in claim 1, wherein the quantity of water in the cementitious mixture of the surface layer ranges from 20 to 60% in mass with respect to the mass of the binder.

19. Paving block as claimed in claim 1, wherein the water reducing additive is selected from the group consisting of fluidifying and super fluidifying agents as defined in the standard UNI EN 934-2.

20. Paving blocks as claimed in claim 19, wherein the water reducing additive is chosen from products based on lignosulphonates or naphthalene, melamine or acrylic based.

21. Paving block as claimed in claim 1, wherein the thickness of the photocatalytic surface layer varies from 5 to 12 mm.

22. Method for the abatement of organic and inorganic pollutants present in the environment comprising the laying of paving blocks for photocatalytic paving as claimed in claim 1.

23. Method of manufacturing the paving block claimed in claim 1, characterized by adding to a base layer, in cementitious material, the composition comprising:
   I. a hydraulic binder
   II. a $TiO_2$-based photocatalyst capable of oxidizing polluting organic and inorganic substances present in the environment in the presence of environmental light, air and humidity
   III. at least an aggregate
   IV. optionally a water reducing additive,
the $TiO_2$-based catalyst being from 0.1 to 4.9% by weight of said hydraulic binder and having a specific surface area selected in the range from 60 to 290 $m^2/g$.

24. Method to prepare the surface layer of the paving blocks of claim 1, characterized by using, as ingredient of said layer, a dry premix comprising:
   I. a hydraulic binder
   II. a $TiO_2$-based photocatalyst capable of oxidizing polluting organic and inorganic substances present in the environment in the presence of environmental light, air and humidity
   III. at least an aggregate
   IV. optionally a water reducing additive,
the $TiO_2$-based catalyst being from 0.1 to 4.9% by weight of said hydraulic binder and having a specific surface area selected in the range from 60 to 290 $m^2/g$.

25. Cementitious composition comprising:
I. a hydraulic binder
II. a $TiO_2$-based photocatalyst capable of oxidizing polluting organic and inorganic substances present in the environment in the presence of environmental light, air and humidity
III. water
IV. at least an aggregate
V. optionally a water reducing additive,
the $TiO_2$-based photocatalyst being from 0.1% to 4.9% by weight of said hydraulic binder and having a specific surface area selected in the range from 60 to 290 $m^2/g$.

26. Composition as claimed in claim 25, wherein the photocatalyst is at least partially in anatase form.

27. Composition as claimed in claim 26, wherein the $TiO_2$ particles have anatase structure for at least 5% as percentage in mass of the $TiO_2$.

28. Composition as claimed in claim 27, wherein the $TiO_2$ particles have anatase structure at 100% in mass of the total $TiO_2$.

29. Composition as claimed in claim 26, wherein the particles of $TiO_2$ have anatase structure for at least 50% as percentage in mass of the total $TiO_2$.

30. Composition as claimed in claim 25, wherein the $TiO_2$ has a specific surface from 105 to 250 $m^2/g$.

31. Composition as claimed in claim 25, also comprising fillers of mineral origin or inorganic filling materials.

32. Composition as claimed in claim 25, wherein the hydraulic binder is chosen from a cement or a clinker.

33. Composition as claimed in claim 32, wherein the cement is chosen from the group consisting of: white, grey or pigmented cement or their mixtures.

34. Composition as claimed in claim 33, wherein the cement is grey cement.

35. Composition as claimed in claim 25, wherein said composition is in the form of mortar or concrete.

36. Composition as claimed in claim 35, wherein the cementitious composition is a mortar having binder:aggregate mass ratios ranging from 1:4 to 1:1 or concrete having binder:aggregate mass ratios ranging from 1:3 to 1:7.

37. Composition as claimed in claim 25, containing the following percentages in mass of inorganic components, with reference to the total mass of the inorganic components in dry state:
hydraulic binder: from 12% to 50% in mass;
aggregate: from 50% to 88% in mass;
filler of mineral origin: up to 10% in mass.

38. Composition as claimed in claim 37, wherein the hydraulic binder is a grey cement.

39. Composition as claimed in claim 25, wherein the aggregate sand, silica or calcareous, having particles with dimensions ranging from 0.075 mm to 4 mm.

40. Composition as claimed in claim 25, wherein the quantity of water in the cementitious mixture of the surface layer ranges from 20 to 60% in mass with respect to the mass of the binder.

41. Composition as claimed in claim 25, wherein the water reducing selected additive is from the group consisting of fluidifying and super fluidifying agents as defined in the standard UNI EN 934-2.

42. Composition as claimed in claim 41, wherein the water reducing additive is chosen from products based on lignosulphonates or naphthalene, melamine or acrylic based.

43. Dry premix comprising:
I. a hydraulic binder
II. a $TiO_2$-based photocatalyst capable of oxidizing polluting organic and inorganic substances present in the environment in the presence of environmental light, air and humidity
III. at least an aggregate
IV. optionally a water reducing additive,
the $TiO_2$-based catalyst being from 0.1 to 4.9% by weight of said hydraulic binder and having a specific surface area selected in the range from 60 to 290 $m^2/g$.

44. Dry premix as claimed in claim 43, wherein the $TiO_2$ photocatalyst is at least partially in anatase form.

45. Dry premix as claimed in claim 44, wherein the $TiO_2$ particles have anatase structure for at least 5 as percentage in mass of the total $TiO_2$.

46. Dry premix as claimed in claim 45, wherein the $TiO_2$ particles have anatase structure at 100% in mass of the total $TiO_2$.

47. Dry premix as claimed in claim 43, wherein the $TiO_2$ has a specific surface from 105 to 250 $m^2/g$.

48. Dry premix as claimed in claim 43, also comprising fillers of mineral origin or inorganic filling materials.

49. Dry premix as claimed in claim 43, wherein the hydraulic binder is chosen from a cement or a clinker.

50. Dry premix as claimed in claim 49, wherein the cement is chosen from the group consisting of: white, grey or pigmented cement or their mixtures.

51. Dry premix as claimed in claim 50, wherein the cement is grey cement.

52. Dry premix as claimed in claim 43, wherein said premix is in a form to provide a mortar or concrete.

53. Dry premix as claimed in claim 52, wherein the premix to provide a mortar has binder:aggregate mass ratios ranging from 1:4 to 1:1 or the premix to provide concrete has binder:aggregate mass ratios ranging from 1:3 to 1:7.

54. Dry premix as claimed in claim 43, containing the following percentages in mass of inorganic components, with reference to the total mass of the inorganic components in dry state:
hydraulic binder: from 12% to 50% in mass;
aggregate: from 50% to 88% in mass;
filler of mineral origin: up to 10% in mass.

55. Dry premix as claimed in claim 54, wherein the hydraulic binder is grey cement.

56. Dry premix as claimed in claim 55, wherein the grey cement is grey cement of type I or type II.

57. Dry premix as claimed in claim 43, wherein the aggregate is sand, silica or calcareous, having particles with dimensions ranging from 0.075 mm to 4 mm.

58. Dry premix as claimed in claim 43, wherein the water reducing additive is selected from the group consisting of fluidifying and super fluidifying agents as defined in the standard UNI EN 934-2.

59. Dry premix as claimed in claim 58, wherein the water reducing additive is chosen from products based on lignosulphonates or naphthalene, melamine or acrylic based.

* * * * *